(No Model.) 4 Sheets—Sheet 1.

C. HOFFMANN & E. RICHTER.
UTILIZING ELECTRIC MOTORS FOR OPERATING MACHINERY.

No. 496,567. Patented May 2, 1893.

WITNESSES:

INVENTORS
Carl Hoffmann
Ernst Richter

BY
ATTORNEY.

(No Model.) 4 Sheets—Sheet 2.
C. HOFFMANN & E. RICHTER.
UTILIZING ELECTRIC MOTORS FOR OPERATING MACHINERY.
No. 496,567. Patented May 2, 1893.
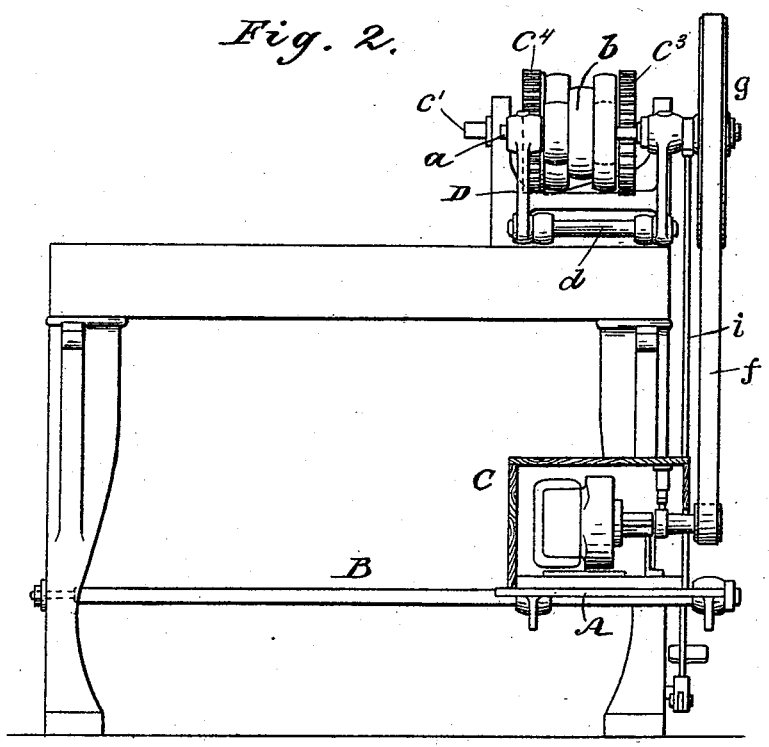
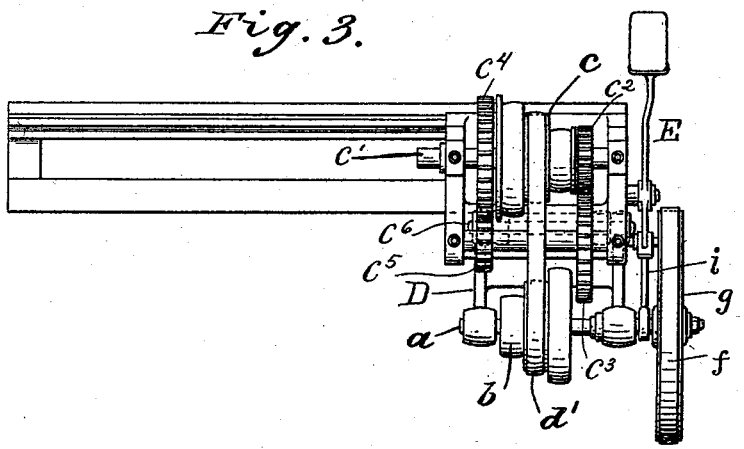
WITNESSES:
Carl Hoffmann
Ernst Richter
INVENTORS
BY
ATTORNEY.

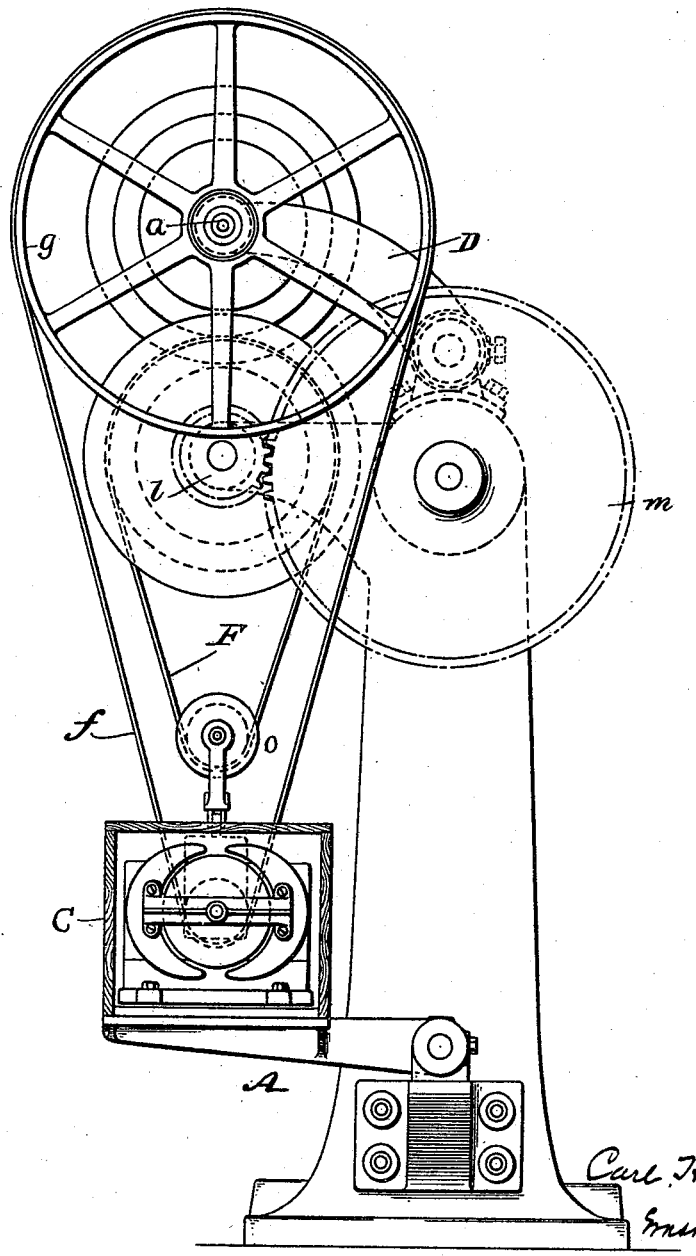

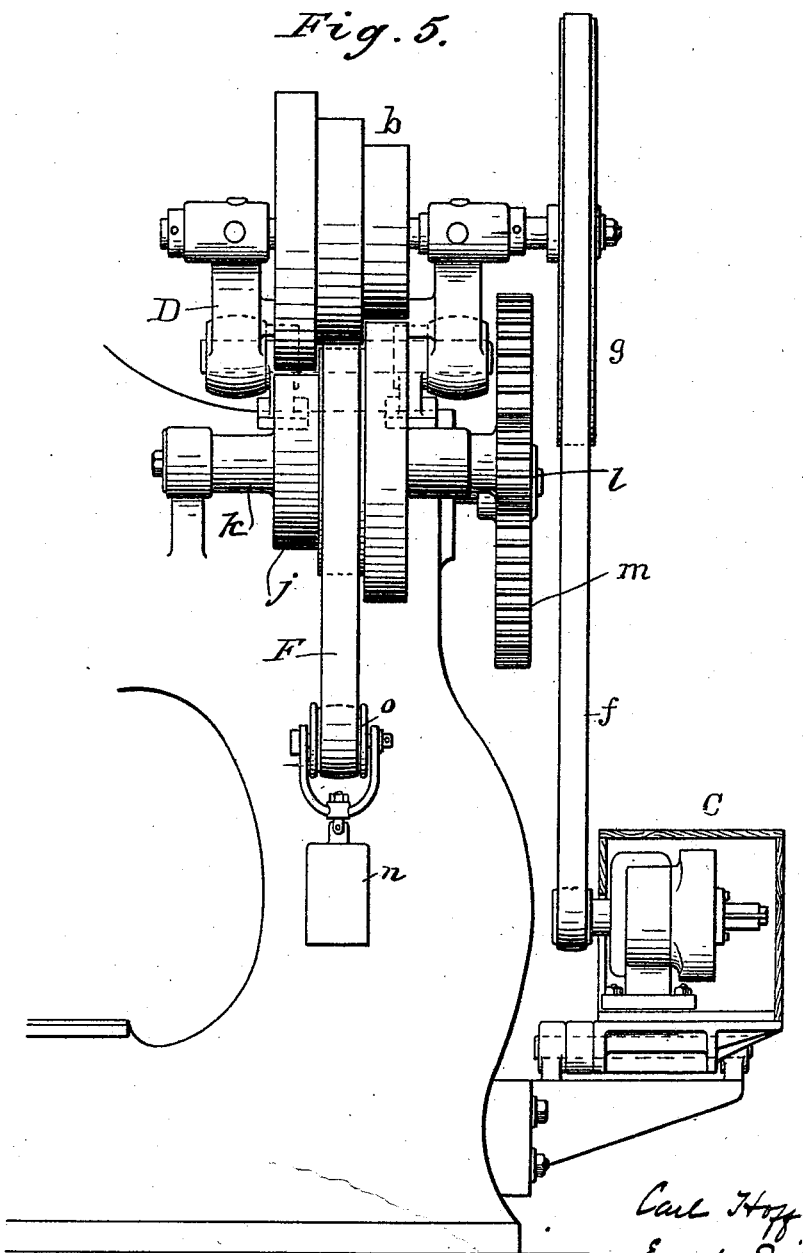

UNITED STATES PATENT OFFICE.

CARL HOFFMANN AND ERNST RICHTER, OF BERLIN, GERMANY, ASSIGNORS TO SIEMENS & HALSKE, OF SAME PLACE.

UTILIZING ELECTRIC MOTORS FOR OPERATING MACHINERY.

SPECIFICATION forming part of Letters Patent No. 496,567, dated May 2, 1893.

Application filed November 7, 1892. Serial No. 451,242. (No model.) Patented in Germany February 9, 1893, No. 66,984.

*To all whom it may concern:*

Be it known that we, CARL HOFFMANN and ERNST RICHTER, subjects of the King of Prussia, German Emperor, residing in the city of Berlin, Kingdom of Prussia, German Empire, have invented new and useful Improvements in Utilizing Electric Motors for Operating Machinery, of which the following is a specification.

The object of our invention is to practically and advantageously utilize electric motors for operating other machines or apparatus in a manner which will most effectively and economically transmit the power of the motor to the machine driven by it, for which we have obtained Letters Patent in Germany, No 66,984, dated February 9, 1893.

It is well known that in order to get the best operative results from an electric motor, it is essential that it be run at a practically uniform speed.

In carrying out our invention, we sustain the electric motor in movable relation to the machine driven by it and avail ourselves of the weight or gravity of the motor in transmitting power to the machine by means of flexible appliances which may be modified by bodily movement of the motor, and whereby any desired speed may be given the driven machine or apparatus, without appreciably or injuriously slackening or varying the speed of the electric motor.

Our improvements also involve other novel features and details hereinafter more fully described.

Figure 1:
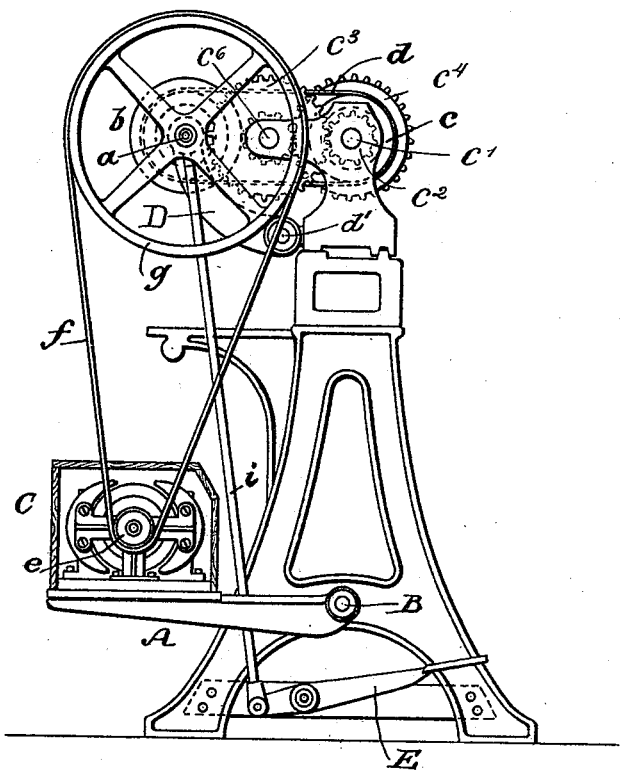
Figure 6:
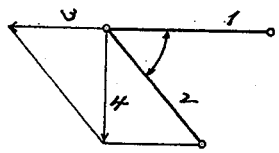

In the accompanying drawings forming part of this specification, Figure 1 is a side view of a power machine, having a driving motor combined therewith, in accordance with our improvements. Fig. 2 is a front view; Fig. 3, a plan view of the apparatus illustrated in Fig. 1. Fig. 4 is a side elevation of a power machine combined with a motor, in accordance with our improvements and showing a modification. Fig. 5 is a front elevation of the apparatus shown in Fig. 4; and Fig. 6 is a diagram illustrating the movable relation of the motor and transmitting gearing with respect to the power machine.

A platform A is pivotally supported at one end by a shaft B, secured in the lower portion of the frame of the power machine, or otherwise suitably supported so that its outer end may be freely movable in an upward or downward direction. Upon this platform is mounted a small electric motor C for driving the power machine. A bracket or frame D is pivotally connected at $d'$ to the power machine adjacent to its bed, and carries in its upper free portion a shaft $a$, upon which is mounted a band wheel $g$ and a graduated or cone pulley $b$. The power of the motor C is transmitted through the pulley $e$ upon its armature shaft by the belt $f$ to the band wheel $g$, and thence through the belt $d$ to the graduated or cone pulley $c$, mounted on the shaft $c'$ of the power machine. On the shaft $c'$ are also the gears $c^2$ and $c^4$, which respectively mesh with the corresponding gears $c^3$ and $c^5$, mounted on the shaft $c^6$. A lever E is pivoted on one of the lower cross-bars of the machine frame and is provided at one end with a treadle plate, while its forward end is attached to the frame D by means of a rod $i$.

With the parts constructed and arranged as described, the frictional relation of the transmitting gearing will be normally positively maintained, since in the first instance, the tension of the belt $d$ is preserved by the weight of the frame D, and the parts carried thereby plus the suspended weight of the motor, exerted through the belt $f$. It will be readily understood that such conditions serve to effect the communication of the full speed of the motor to the power machine.

Now, should it be desired to modify or interrupt the speed of the power machine, to permit the belt $d$ to be shifted, or for any other object, the treadle end of the lever is depressed by the foot of the attendant, so that the frame D and suspended motor are elevated to relieve the tension of belt $d$, thereby modifying the transmitted speed in proportion to the degree of elevation of the frame D. It will therefore be understood that such an operation is highly advantageous since, as before generally explained, the desired modification of the speed of the power machine can be effected without in any way varying or affecting the speed of the motor.

The normal tension of the belt $d$ is best illustrated by the diagram, Fig. 6, wherein line 1 refers to the belt, line 2, the frame D, and lines 3 and 4, the compound tension force exerted by the suspended motor on the belt d.

In Figs. 4 and 5, we have shown a construction modified to adapt the improvements for use in connection with arrangements wherein the power machine is driven by means of frictional contact pulleys. The frame D is pivoted at its inner end and carries the graduated friction pulleys b in frictional relation with a set of corresponding pulleys j, turning with a counter shaft k the end gear pinion l of which permanently engages the driven gear wheel m of the power machine.

The frictional engagement of the pulleys b and j is normally maintained by the weight of the motor acting through the belt f on the band wheel g on the end of shaft a, to which motion is communicated by said belt. The relatively reversed graduated pulleys b j are of equal dimensions, so that they would, in the absence of special provision to the contrary, bear a fixed relation to each other. In order, however, to permit the frictional engagement of any one of the driving pulleys b, with the opposite driven pulley j, and maintain the other pulleys out of operative contact, we employ a belt or band F, which passes over one of the pulleys j and is given the desired tension by means of a weight n, carrying a pulley o hung on said belt.

The thickness of belt interposed between any one of the pulleys b and opposite pulley j will be sufficient to insure the communication of movement from the former to the latter while the other pulleys are out of engagement. By slightly elevating the frame D, the belt F can be readily shifted from one pulley j to another and thereby vary the degree of transmitted speed without modifying the action of the motor.

The weight n suspended by the pulley o enables the belt F to have a travel corresponding with the frictional motion transmitted, so that the belt will not bind nor offer any objectionable resistance to the frictional transmission. This last described modified construction shown in Figs. 4 and 5, is not essentially different in some features from the other construction shown in Figs. 1, 2, and 3 of the drawings, as in both constructions the machine to be operated has a pivoted frame carrying gearing which transmits to the operative shaft or part of the machine the power derived through the belt f from the electric motor. The construction shown in Figs. 4 and 5, however, provide for transmission of the power by utilizing the weight of the electric motor through the belt f, the pivoted frame D, and the cone pulley b upon the counterweighted belt F, in frictional contact with one of the pulleys of the lower cone pulley j which is geared at l, m, to the operative part or shaft of the machine to be driven, and change of speed of the machine is provided for by simply shifting the counterweighted belt F, laterally between the opposing cone pulleys b, j, of the machine, instead of being effected by means of the treadle and rod connections E, i, as in the first described construction shown in Figs. 1, 2 and 3 of the drawings. We intend, however, to make a separate application to patent this special feature of using the counterweighted belt F between the cone pulleys of a machine operated by an electric motor. We also specially mention the fact that in the construction shown in Figs. 1 and 2 of the drawings, the driving belt f remains taut between the motor pulley e and the machine pulley g, during the lifting of the pivoted frame D, by the treadle connections E, i and the consequent yielding or slackening of the belt d, which slips more or less on the cone pulleys to vary the speed of the operative spindle or part of the machine, and to an extent depending upon the range of depression of the treadle lever by the attendant.

We claim—

1. The combination with a power machine, of an electric motor and frictional transmission gear, the motor being movable in its relation to the power machine to modify the transmission gear and thereby vary the speed of the power machine without varying the speed of the electric motor.

2. The combination with a power machine, of a suspended electric motor and frictional transmission gear held in operative relation by the weight of the motor, the movable capability of the latter serving to permit the variation of the transmission gear and thereby the speed of the power machine without varying the speed of the electric motor.

3. The combination with a power machine, of a movable frame carrying transmission gearing for driving the power machine, and a pivotally supported electric motor suspended by its driving belt from the frame gearing, substantially as described.

4. The combination with a power machine, of a movable frame carrying transmission gearing for the power machine, a movable electric motor suspended by its driving belt from the frame gearing, and a foot lever and connection for vertically moving the frame to modify the relation of the transmission gearing, substantially as described.

5. The combination with a power machine, of a movable frame carrying transmission gearing imparting motion to the power machine by a belt, and an electric motor geared with the transmission gearing by a belt, said motor being movable in its relation to the power machine to release or slack the belt between the latter and the transmission gearing and still maintain the motor belt taut, substantially as described.

6. The combination with a power machine, of an electric motor, interposed mechanism for transmitting the power of the motor to the power machine, and means, substantially as described, for varying the energy transmitted without varying the speed of the motor.

7. The combination with a power machine, of an electric motor, interposed mechanism for transmitting the power of the motor to the power machine, and means for varying the energy transmitted without varying the speed of the motor, which means consists of mechanism which acts to modify the effective weight of the motor and thereby effect alterations in the speed of the power machine.

8. The combination with a power machine, of an electric motor, interposed flexible mechanism for transmitting the power of the motor to the power machine, and means for varying the power transmitted without varying the speed of the motor, by varying the tension exerted by the weight of the motor upon the flexible transmitting mechanism.

9. The combination with a power machine, of a pivoted platform, an electric motor mounted upon said platform, a pivoted frame carrying a band wheel and a graduated or cone pulley, a belt interposed between the band wheel and the electric motor, a belt interposed between the graduated or cone pulley on the pivoted frame and a similar pulley upon the power machine, and a device for varying the tension of said last named belt, to vary the speed of the power machine.

In testimony whereof we have affixed our signatures in the presence of two witnesses.

CARL HOFFMANN.
ERNST RICHTER.

Witnesses:
   GUSTAV STENZEL,
   MAX WAGNER.